(12) United States Patent
Liu et al.

(10) Patent No.: US 10,965,916 B2
(45) Date of Patent: Mar. 30, 2021

(54) VIDEO FILE PROCESSING METHOD, VIDEO FILE PROCESSING DEVICE AND MONITORING SYSTEM

(71) Applicant: Wistron Corporation, New Taipei (TW)

(72) Inventors: Zhen-Te Liu, New Taipei (TW); Yu-Yen Chen, New Taipei (TW)

(73) Assignee: Wistron Corporation, New Taipei (TW)

( * ) Notice: Subject to any disclaimer, the term of this patent is extended or adjusted under 35 U.S.C. 154(b) by 0 days.

(21) Appl. No.: 16/360,015

(22) Filed: Mar. 21, 2019

(65) Prior Publication Data

US 2020/0195894 A1 Jun. 18, 2020

(30) Foreign Application Priority Data

Dec. 12, 2018 (TW) .................................. 10714488.9

(51) Int. Cl.
*G06K 9/00* (2006.01)
*H04N 7/18* (2006.01)

(52) U.S. Cl.
CPC ......... *H04N 7/188* (2013.01); *G06K 9/00718* (2013.01); *G06K 9/00751* (2013.01); *G06K 2009/00738* (2013.01)

(58) Field of Classification Search
CPC ............... H04N 7/188; G06K 9/00718; G06K 9/00751; G06K 2009/00738; G06K 9/00771
See application file for complete search history.

(56) References Cited

U.S. PATENT DOCUMENTS

| | | | | |
|---|---|---|---|---|
| 10,438,164 | B1* | 10/2019 | Xiong | G06K 9/78 |
| 2016/0292511 | A1* | 10/2016 | Ayalasomayajula | G06K 9/00751 |
| 2017/0213086 | A1* | 7/2017 | Cao | G11B 27/105 |
| 2017/0262707 | A1* | 9/2017 | Zhao | G11B 27/031 |
| 2019/0013047 | A1* | 1/2019 | Wait | G11B 27/002 |

FOREIGN PATENT DOCUMENTS

| | | |
|---|---|---|
| CN | 101493838 | 9/2010 |
| CN | 202713515 | 1/2013 |
| CN | 106507180 | 3/2017 |

OTHER PUBLICATIONS

"Office Action of Taiwan Counterpart Application," dated Jul. 24, 2019, p. 1-p. 13.
"Office Action of China Counterpart Application", dated Jan. 19, 2021, with Brief English summary thereof, p.1-p.78.

* cited by examiner

*Primary Examiner* — John R Schnurr
(74) *Attorney, Agent, or Firm* — JCIPRNET

(57) ABSTRACT

A video file processing method for making and outputting an event film according to video files is provided. The method includes: acquiring at least one video file and detecting a plurality of events and an occurring time of each event in the video file; extracting a plurality of event clips including the events from the video file according to the occurring time; obtaining an event film by assembling a plurality of concerned clips in the event clips according to a merging rule; and outputting the event film. In addition, a video file processing device and a monitoring system using the method are also provided.

14 Claims, 6 Drawing Sheets

VIDEO FILE PROCESSING METHOD, VIDEO FILE PROCESSING DEVICE AND MONITORING SYSTEM

CROSS-REFERENCE TO RELATED APPLICATION

This application claims the priority benefit of Taiwan application serial no. 107144889, filed on Dec. 12, 2018. The entirety of the above-mentioned patent application is hereby incorporated by reference herein and made a part of this specification.

BACKGROUND OF THE INVENTION

1. Field of the Invention

The present invention relates to a film editing technology, in particular, to a video file processing method, a video file processing device, and a monitoring system.

2. Description of Related Art

In recent years, the rate of population aging is growing rapidly. In a busy city, children are not able to take care of their elders at close range at any time. Therefore, home care is becoming more and more important, and home care institutions or care dispatch centers are also born. Even in institutions for aged care or patient care, caregivers cannot take care of all elders or patients one to one. Therefore, these institutions often set up monitoring systems such as a plurality of cameras in an indoor environment to monitor elders or patients.

However, although the monitoring system records the video of each camera, the video content cannot be well analyzed or organized. Therefore, when there are accidents or abnormal events such as falls, a caregiver or manager needs to take a lot of time and energy to access video files concerned with the search. If there is a plurality of cameras, it is more difficult for a plurality of video files to rapidly distinguish the image correlation to find out the occurrence and cause of an event. In addition, the synchronization and overlapping storage of a plurality of video files of a plurality of cameras may also consume or waste a considerable storage space.

SUMMARY OF THE INVENTION

In view of this, the present invention provides a video file processing method, a video file processing device, and a monitoring system, which can assemble a plurality of video files more efficiently.

The video file processing method according to an embodiment of the present invention includes: acquiring at least one video file and detecting a plurality of events and an occurring time of each event in the at least one video file; extracting a plurality of event clips including the plurality of events from the at least one video file according to the occurring time; obtaining an event film by assembling a plurality of concerned clips in the plurality of event clips according to a merging rule; and outputting the event film.

The video file processing device according to an embodiment of the present invention includes a storage element and a processor. The storage element stores a plurality of modules. The processor is coupled to the storage element, and configured to access and perform the modules stored in the storage element. The modules include a video file acquiring module, an event detecting module, a clip extracting module, a clip assembling module, and an event outputting module. The video file acquiring module is configured to acquire at least one video file. The event detecting module is configured to detect a plurality of events and an occurring time of each event in the at least one video file. The clip extracting module is configured to extract a plurality of event clips including the plurality of events from the at least one video file according to the occurring time. The clip assembling module is configured to obtain an event film by assembling a plurality of concerned clips in the plurality of event clips according to a merging rule, where the merging rule includes a plurality of pre-defined reasonable event sequences, and the events in the event film conform to the plurality of reasonable event sequences. The film outputting module is configured to output the event film.

The monitoring system according to an embodiment of the present invention includes at least one camera and a video recording device. The at least one camera is configured to capture at least one video file. The video recording device is coupled to the at least one camera, and configured to: receive and record the at least one video file; acquire the at least one video file and detect a plurality of events and an occurring time of each event in the at least one video file; extract a plurality of event clips including the plurality of events from the at least one video file according to the occurring time; obtain an event film by assembling a plurality of concerned clips in the plurality of event clips according to a merging rule, where the merging rule includes a plurality of pre-defined reasonable event sequences, and the events in the event film conform to the plurality of reasonable event sequences; and output the event film.

Based on the foregoing, the video file processing method, the video file processing device, and the monitoring system provided by the embodiments of the present invention can analyze a plurality of event clips from video files captured by one or more cameras, and organize a portion of event clips into an event film through a well-defined merging rule. Accordingly, a user can find required segments more rapidly, thereby improving convenience and improving user experience.

In order to make the aforementioned and other features and advantages of the present invention comprehensible, embodiments accompanied with figures are described in detail below.

DESCRIPTION OF THE EMBODIMENTS

Some of the embodiments of the present invention will be accompanied with the drawings in the following for detailed description. When the same element symbols referenced in the following description appear in different drawings, they will be regarded as the same or similar elements. These examples are merely a part of the present invention and do not disclose all of the implementable modes of the present invention. Rather, these embodiments are merely examples of a method, device and system in the scope of the patent application of the present invention.

Figure 1:
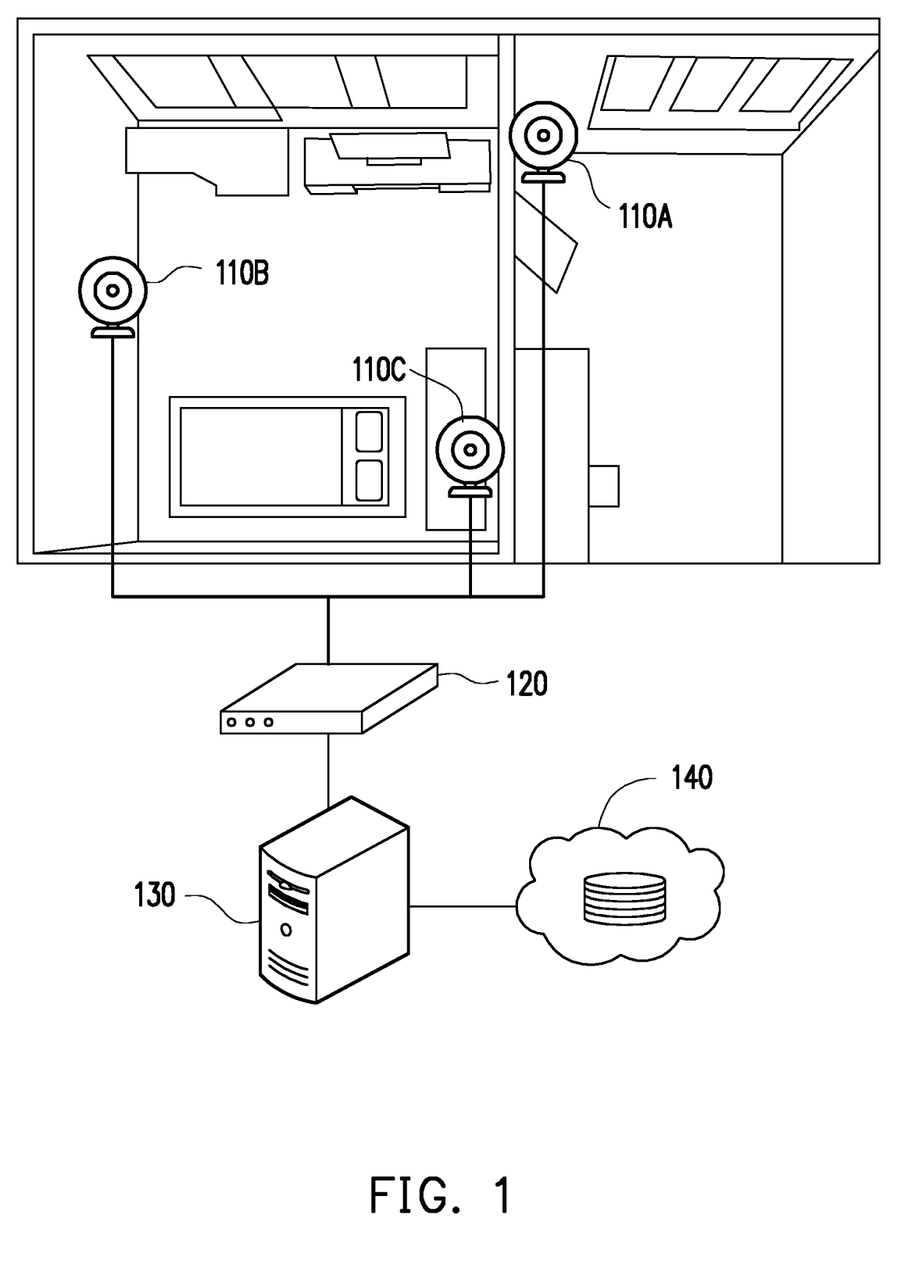
FIG. 1 is a schematic diagram of a monitoring system according to an embodiment of the present invention.

FIG. 1 is a schematic diagram of a monitoring system according to an embodiment of the present invention.

Referring to FIG. 1, the monitoring system of the present embodiment includes a plurality of cameras 110A, 110B, and 110C, a network video recorder (NVR) 120, a video file processing device 130, and a cloud database 140. The plurality of cameras 110A, 110B, and 110C may be coupled to the network video recorder 120 in a wired or wireless manner. In addition, the video file processing device 130 may be coupled to the network video recorder 120 and the cloud database 140 in a wired or wireless manner. In the present embodiment, video files captured by the plurality of cameras 110A, 110B, and 110C may be recorded in the network video recorder 120, and the video file processing device 130 acquires a video file from the network video recorder 120, processes the video file to generate an event film, and then uploads and stores the event film into the cloud database 140. However, in other embodiments of the present invention, the network video recorder 120 and the video file processing device 130 may also be integrated into one video recording device. In other embodiments of the present invention, the video files captured by the plurality of cameras 110A, 110B, and 110C may also be recorded in the video file processing device 130.

In the present embodiment, the plurality of cameras 110A, 110B, and 110C are disposed at different positions respectively and configured to capture environments of different positions and/or angles to generate video files respectively. For example, the camera 110A is disposed adjacent to a doorway of a room to capture a person entering and leaving the room; the camera 110B is disposed on a wall or ceiling of the room to capture a person walking in the room; and the camera 110C is disposed on a bedside in the room to capture a person who goes to bed, gets out of bed, or lies in bed.

Although the monitoring system of the present embodiment has been described with three cameras as an example, the present invention is not limited thereto. In other embodiments, the monitoring system may also include one, two, four, five or more cameras.

In the present embodiment, the network video recorder 120 is configured to collect, integrate and manage the video files captured by the cameras 110A, 110B, and 110C. For example, the network video recorder 120 may include a storage device, and the network video recorder 120 may organize the video files captured by each camera by using a folder or a file name, and the like.

Figure 2:
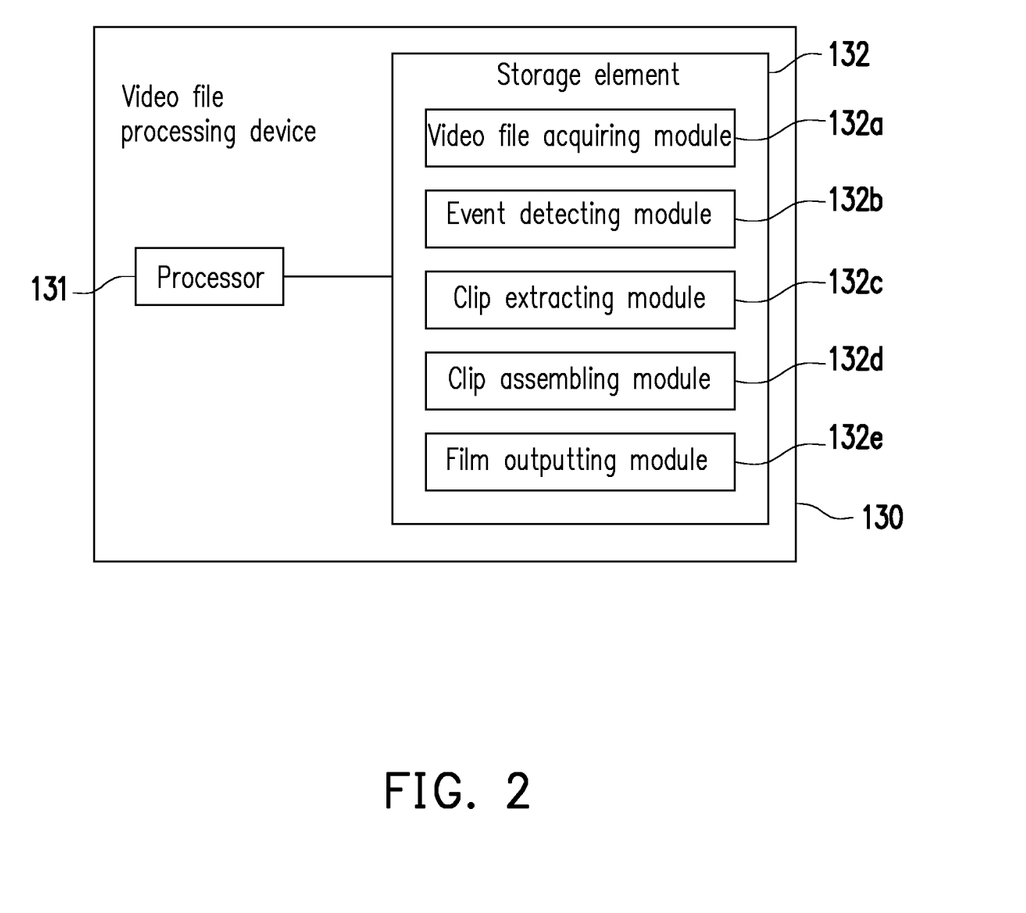
FIG. 2 is a schematic diagram of a video file processing device according to an embodiment of the present invention.

In the present embodiment, the video file processing device 130 is, for example, an electronic device having a video file processing function, such as a personal computer, a notebook computer, a smart phone, a tablet computer, or a personal digital assistant. However, the present invention is not limited thereto. FIG. 2 is a schematic diagram of a video file processing device according to an embodiment of the present invention. Referring to FIG. 2, the video file processing device 130 includes a processor 131 and a storage element 132, where the processor 131 is coupled to the storage element 132. The storage element 132 stores a video file acquiring module 132a, an event detecting module 132b, a clip extracting module 132c, a clip assembling module 132d, and a film outputting module 132e. Each of the foregoing modules is, for example, a computer program, which can load the processor 131 to perform the video file processing function in the embodiment of the present invention by the processor 131. It should be noted that the storage element 132 described in the foregoing embodiments is not limited to a single storage, and the foregoing modules may also be separately stored in two or more storages of the same or different types.

In the present embodiment, the video file processing device 130 generates event clips, event films, and the like by processing the video files, and the video file processing device 130 may upload the event clips and the event films to the cloud database 140. In some embodiments, the cloud database 140 may be connected to a server. The foregoing server lists the event clips and the event films recorded in the cloud database 140, for example, in the form of web pages, and a user can click on the web page to download or view a selected event clip or event film online. However, the present invention does not limit a specific method for using the event clips and the event films recorded in the cloud database 140 herein.

Figure 3:
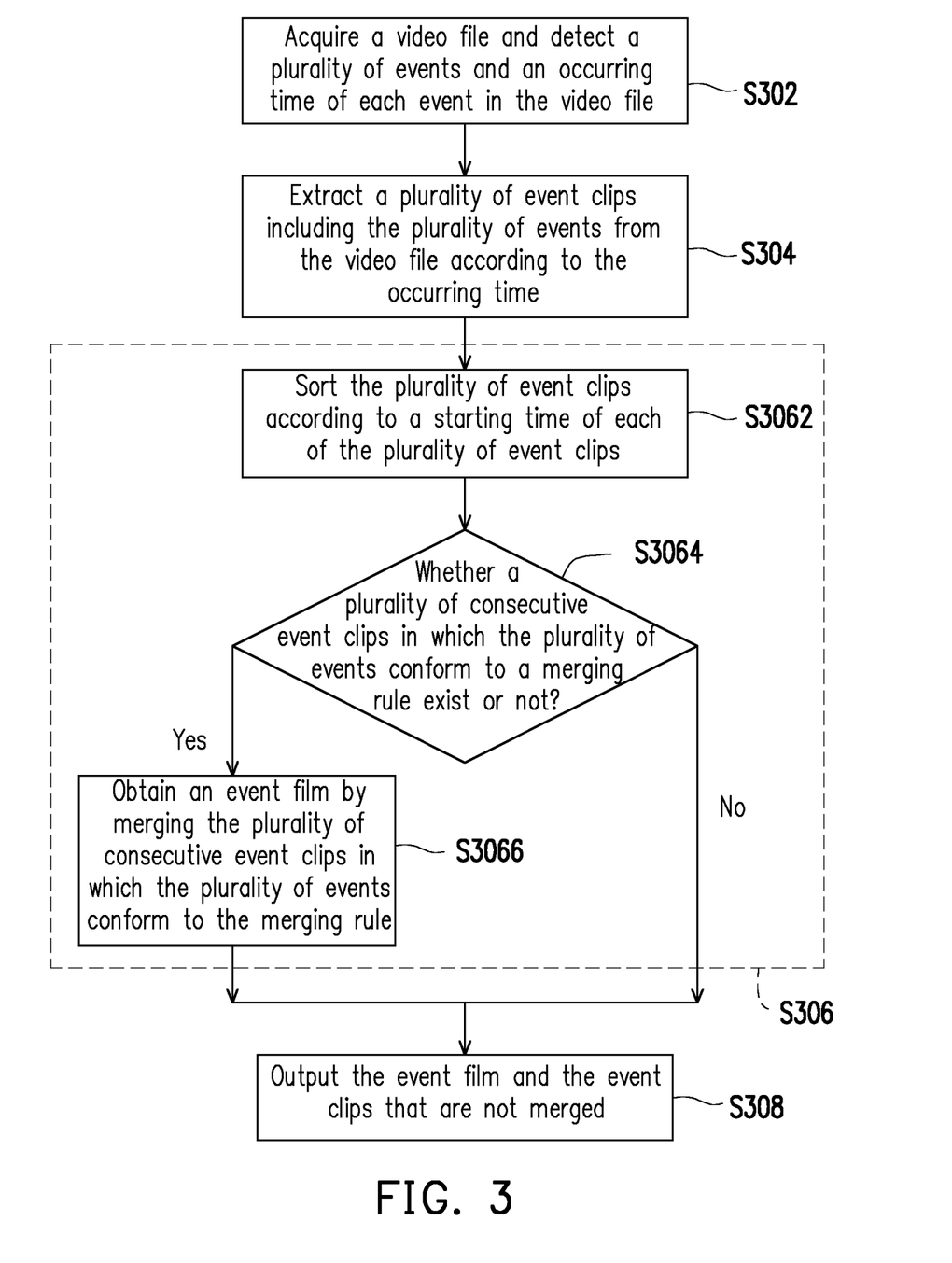
FIG. 3 is a flowchart of a video file processing method according to an embodiment of the present invention.

FIG. 3 is a flowchart of a video file processing method according to an embodiment of the present invention. The method of the present embodiment is applied to the video file processing device 130 in FIG. 2, and the detailed steps of the video file processing method will be described below in conjunction with various elements in the video file processing device 130.

First, the processor 131 acquires a video file and detects a plurality of events and an occurring time of each event in the video file (step S302). In detail, the video file acquiring module 132a acquires the video files captured by the cameras 110A, 110B, and 110C from the network video recorder 120, and the event detecting module 132b uses image analysis to detect whether a default event occurs in the video file or not and to record an occurring time of the event. The foregoing events include, for example, entering and leaving a room, falling, going to bed, getting out of bed, getting up, lying down, and bed activities, and the like, and the present invention is not limited thereto.

In the present embodiment, the event detecting module 132b detects different events for video files from different cameras. For example, for the video file from the camera 110A at the doorway, the event detecting module 132b detects an event such as entering or leaving the room; for the video file from the camera 110B on the wall or ceiling of the room, the event detecting module 132b detects a falling event; and for the camera 110C from the bedside, the event detecting module 132b detects events such as going to bed, getting out of bed, getting up, lying down, and bed activities. However, the present invention is not limited thereto. In other embodiments, the event detecting module 132b may also not distinguish the source of the video file when detecting an event.

Then, the processor 131 extracts a plurality of event clips including the plurality of events from the video file according to the occurring time (step S304). In detail, the clip extracting module 132c extracts an event clip including an event from the video file according to the occurring time of the event. For example, if the event detecting module 132b detects that a first event occurs at a first occurring time in a first video file, the clip extracting module 132c extracts, according to the first occurring time, a first event clip including the first event from the first video file, where a time segment of the first event clip may include the first occurring time; and if the event detecting module 132b detects that a second event occurs at a second occurring time in a second video file different from the first video file, the clip extracting module 132c extracts, according to the second occurring time, a second event clip including the second event from the second video file, where a time segment of the second event clip may include the second occurring time.

In some embodiments, the clip extracting module 132c makes an event clip by taking 15 seconds before and after the occurring time of an event. For example, if the event detecting module 132b detects a falling event from a video file at 12:00:00, the clip extracting module 132c extracts a fragment of 11:59:45 to 12:00:15 from the video file to serve as an event clip. However, the present invention does not limit a specific manner of an event clip, as long as the extracted event clip includes an occurred event.

In the present embodiment, the clip assembling module 132d may also assemble event clips of video files from the same camera if two event clips are temporally close and there is any overlap of images. In detail, if the same camera captures two events within a short time, the clip extracting module 132c will generate two event clips of the two events. The clip assembling module 132d determines that if occurring times of the two events are quite close and images of the two event clips partially overlap, the two event clips are assembled into one event clip, that is, overlapping image portions are clipped from one of the two event clips, and then the two processed event clips are spliced. For example, the clip extracting module 132c extracts a first event clip including a first event from a first video file, and extracts a second event clip including a second event from a second video file. If the first video file and the second video file are one or two different video files from the same camera, when a time difference between a first occurring time of the first event and a second occurring time of the second event is less than a preset threshold value, the clip assembling module 132d assembles the first event clip and the second event clip into an event clip simultaneously including the first event and the second event.

Figure 4:
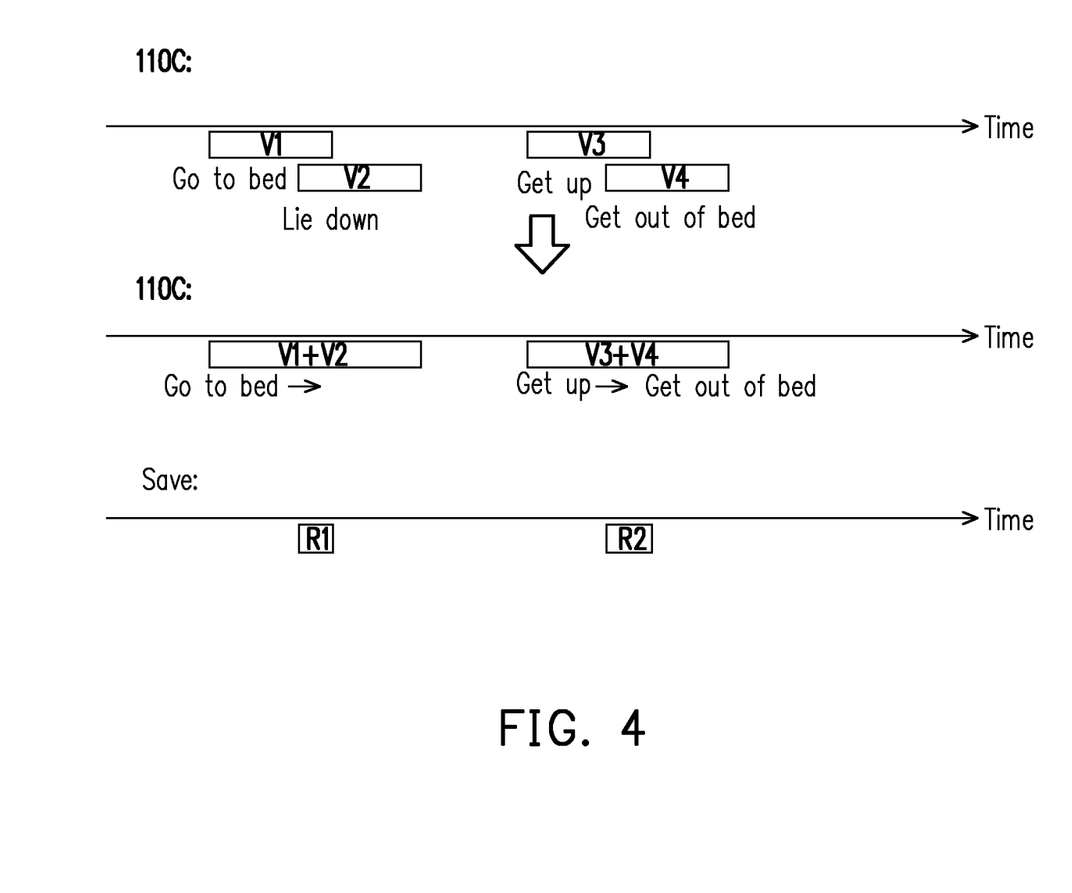
FIG. 4 is a schematic diagram of assembling event clips of video files of a same camera according to an embodiment of the present invention.

FIG. 4 is a schematic diagram of assembling event clips of video files of a same camera according to an embodiment of the present invention.

Referring to FIG. 4, the clip extracting module 132c makes, for example, an event clip by taking 15 seconds before and after the occurring time of an event. In the present embodiment, event clips V1 to V4 are all extracted by the clip extracting module 132c from the video files captured by the camera 110C, where the event clip V1 includes a going-to-bed event, the event clip V2 includes a lying-down event, the event clip V3 includes a get-up event, and the event clip V4 includes a getting-out-of-bed event.

Since a time difference between two occurring times of the event clip V1 and the event clip V2 is less than a preset threshold value (such as 15 seconds), the time segments of the event clip V1 and the event clip V2 may overlap. Based on this, the clip assembling module 132d assembles the event clip V1 and the event clip V2 into an event clip V1+V2, which sequentially includes a going-to-bed event and a lying-down event. In the present embodiment, the starting time of the assembled event clip V1+V2 is the same as the starting time of the event clip V1, and the end time of the event clip V1+V2 is the same as the end time of the event clip V2. However, the present invention does not limit a specific mode of assembling herein.

Similarly, since a time difference between two occurring times of the event clip V3 and the event clip V4 is less than the preset threshold value (such as 15 seconds), the time segments of the event clip V3 and the event clip V4 may overlap. Based on this, the clip assembling module 132d assembles the event clip V3 and the event clip V4 into an event clip V3+V4, which sequentially includes a get-up event and a getting-out-of-bed event.

In particular, the time length of the assembled event clip V1+V2 may be shorter than the total time length of the event clip V1 and the event clip V2, and the time length of the assembled event clip V3+V4 may be shorter than the total time length of the event clip V3 and the event clip V4. Therefore, the time can be saved during playing. In the present embodiment, a time R1 saved by playing the assembled event clip V1+V2 compared to playing the event clip V1 and the event clip V2 is, for example, equal to the overlap time of the event clip V1 and the event clip V2; and a time R2 saved by playing the assembled event clip V3+V4 compared to playing the event clip V3 and the event clip V4 is, for example, equal to the overlap time of the event clip V3 and the event clip V4. In some embodiments, all event clips are temporarily stored in a temporary storage area of the video file processing device 130, so the storage space can also be saved by assembling some event clips in advance.

In addition, in some embodiments, the processor 131 first determines whether two events correspond to a same person or not, and only when the two events correspond to the same person, event clips of the two events are assembled. For example, the processor 131 first uses image analysis to determine whether the going-to-bed event in the event clip V1 and the lying-down event in the event clip V2 correspond to the same person or not, and if so, the event clip V1 and the event clip V2 are assembled into the same event clip V1+V2. Otherwise, if the going-to-bed event in the event clip V1 and the lying-down event in the event clip V2 correspond to different people, even if there is an overlap of a time interval between the event clip V1 and the event clip V2, they will not be assembled.

According to the foregoing mode, the processor 131 can acquire a plurality of event clips, and each event clip includes one or more events. After acquiring a plurality of event clips, the processor 131 obtains an event film by assembling a plurality of concerned clips in the plurality of event clips according to a merging rule (step S306). Specifically, the plurality of concerned clips refers to event clips that are assembled into the same event film, and these concerned clips that are assembled into the same event film must conform to the merging rule. From another perspective, among the plurality of event clips, a plurality of consecutive event clips that conform to the merging rule may be referred to as a plurality of concerned clips. Details regarding the merging rule will be described in the following embodiments.

First, the clip assembling module 132d sorts the plurality of event clips according to a starting time of the plurality of event clips (step S3062), and then determines whether the plurality of events in a plurality of consecutive event clips conform to the merging rule or not (step S3064). If so, the clip assembling module 132d obtains the event film by merging the plurality of consecutive event clips in which the plurality of events conform to the merging rule (step S3066). The foregoing steps will be described below by way of an embodiment with reference to FIG. 5.

Figure 5:
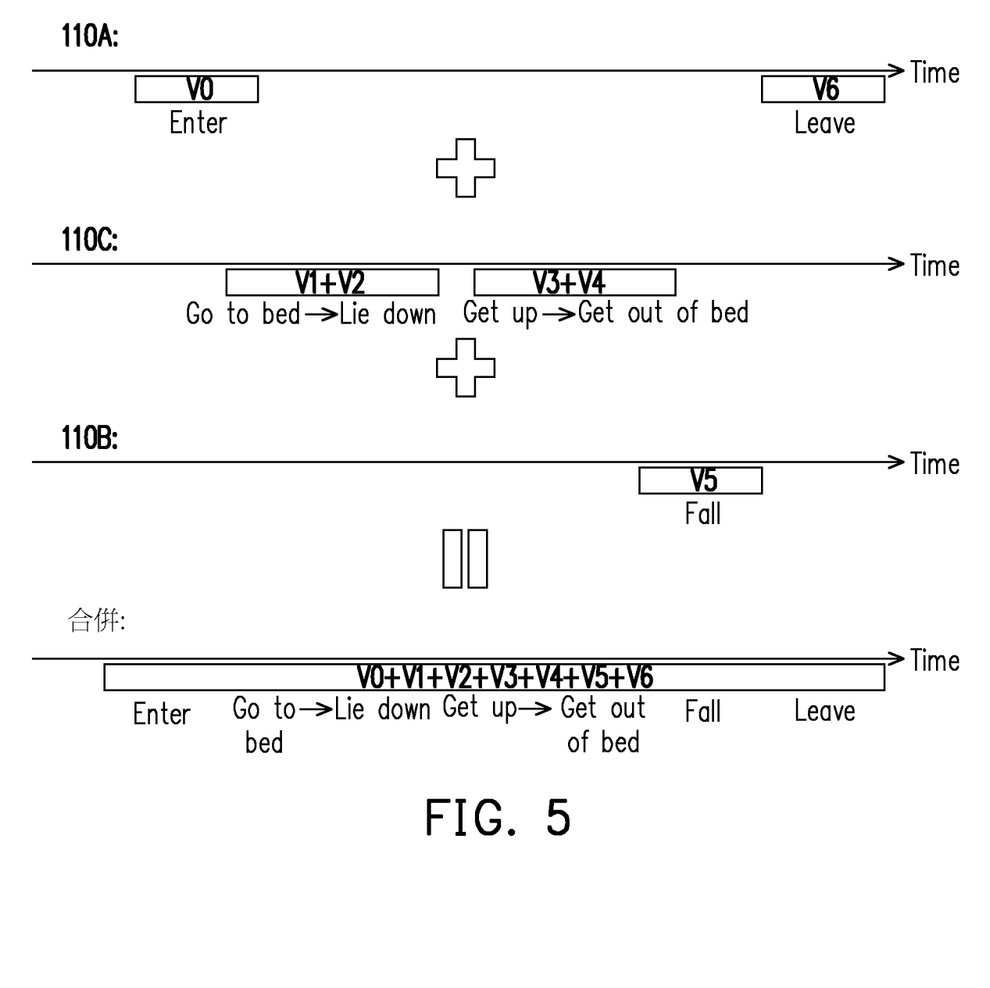
FIG. 5 is a schematic diagram of obtaining an event film by assembling a plurality of consecutive clips according to an embodiment of the present invention.

FIG. 5 is a schematic diagram of obtaining an event film by assembling a plurality of concerned clips according to an embodiment of the present invention.

Referring to FIG. 5, event clips V0 and V6 are, for example, extracted by the clip extracting module 132c from the video files captured by the camera 110A, where the event clip V0 includes an entry (door) event, and the event clip V6 includes a leaving (door) event. The event clips V1+V2 and V3+V4 are, for example, an assembly result of the clip assembling module 132d in the embodiment of FIG. 4. The event clip V5 is, for example, extracted by the clip extracting module 132c from the video files captured by the camera 110B, where the event clip V5 includes a falling event. If sorting is performed according to the starting time, five consecutive event clips are sequentially the event clip V0, the event clip V1+V2, the event clip V3+V4, the event clip V5, and the event clip V6.

If a plurality of events in a plurality of consecutive event clips conforms to the merging rule, the clip assembling module 132d merges the consecutive event clips together. In the present embodiment, the merging rule includes, for example, a plurality of pre-defined reasonable event sequences. If a plurality of events in a plurality of consecutive event clips does not conform to the foregoing reasonable event sequences, these events do not conform to the merging rule. For example, a plurality of reasonable event sequences defined in the merging rule is displayed in the following table 1.

TABLE 1

| Number | Camera | Event | Reasonable event sequence |
|---|---|---|---|
| 1 | 110A | Enter | First |
| 2 | 110A | Leave | Last |
| 3 | 110B | Fall | Between 1 and 4 or between 5 and 2 |
| 4 | 110C | Go to bed | Between 1 and 5 or between 1 and 6 orbetween 1 and 7 or between 1 and 8 |
| 5 | 110C | Get out of bed | Between 4 and 2 |
| 6 | 110C | Get up | Between 7 and 5 |
| 7 | 110C | Lie down | Between 4 and 5 |
| 8 | 110C | Bed activity | Between 7 and 6 |

Referring to Table 1, if a plurality of events include an entry event, the entry event must be a first event among the plurality of events to conform to the reasonable event sequences; if a plurality of events include a leaving event, the leaving event must be the last event among the plurality of events to conform to the reasonable event sequences; if a plurality of events include a falling event, the falling event must be sorted between a No. 1 entry event and a No. 4 going-to-bed event, or sorted between a No. 5 getting-out-of-bed event and a No. 2 leaving event to conform to the reasonable event sequences, and so on.

Returning to FIG. 5, a plurality of events in a plurality of consecutive event clips V0, V1+V2, V3+V4, V5, and V6 are sequentially an entry event, a going-to-bed event, a lying-down event, a get-up event, a getting-out-of-bed event, a falling event, and a leaving event. After determining that the plurality of events conform to the reasonable event sequences in Table 1, the clip assembling module 132d merges the consecutive event clips V0, V1+V2, V3+V4, V5, and V6, to obtain an event film V0+V1+V2+V3+V4+V5+V6. Since the plurality of consecutive event clips V0, V1+V2, V3+V4, V5, V6 are merged into an event film, these consecutive event clips V0, V1+V2, V3+V4, V5, and V6 may be referred to as a plurality of concerned clips.

In some embodiments, when two event clips overlapping in time intervals are merged, the clip assembling module 132d clips, for example, the event clip sorted ahead, and then splices the event clip sorted behind. When two event clips not overlapping in time intervals are merged, the clip assembling module 132d may, for example, directly allow the event clip sorted behind to be sorted behind the event clip sorted ahead.

For example, a time interval of the event clip V0 is in a range of 12:00:00 to 12:00:15; a time interval of the event clip V1+V2 is in a range of 12:00:10 to 12:00:30; a time interval of the event clip V3+V4 is in a range of 14:00:00 to 14:00:30; a time interval of the event clip V5 is in a range of 14:00:25 to 14:00:55; and a time interval of the event clip V6 is in a range of 14:00:50 to 14:01:20. The content of the event film V0+V1+V2+V3+V4+V5+V6 from the $0^{th}$ second to the $10^{th}$ second is the content of the event clip V0; the content from the $10^{th}$ second to the $30^{th}$ second is the content of the event clip V1+V2; the content from the $30^{th}$ second to the $55^{th}$ second is the content of the event clip V3+V4; the content from the $55^{th}$ second to the $80^{th}$ second is the content of the event clip V5; and the content from the $80^{th}$ second to the $110^{th}$ second is the content of the event clip V6. That is to say, a video file from 12:00:00 to 14:01:20 in the room will be condensed into a 110-second event film including the falling event. However, the present invention does not limit a specific manner of merging herein, and those of ordinary skill in the art can implement it according to different needs.

It is worth mentioning that, in order to facilitate the description of the details of assembling event clips, five consecutive event clips conforming to the merging rule are exemplarily selected from the event clips V0, V1+V2, V3+V4, V5, and V6 in the embodiment of FIG. 5 as an example. It must be understood that the plurality of event clips obtained by the processor 131 in step S304 may also include a plurality of other consecutive event clips, which may also be assembled into an event film in the manner described in the previous paragraph. In other words, after sorting is performed according to the starting time, as long as a plurality of events in a plurality of consecutive event clips conforms to the merging rule, the clip assembling module 132d merges the consecutive event clips together.

In some embodiments, the merging rule also stipulates that all events in a plurality of concerned clips must correspond to the same person, that is, each event in an event film occurs on the same person.

Figure 6:
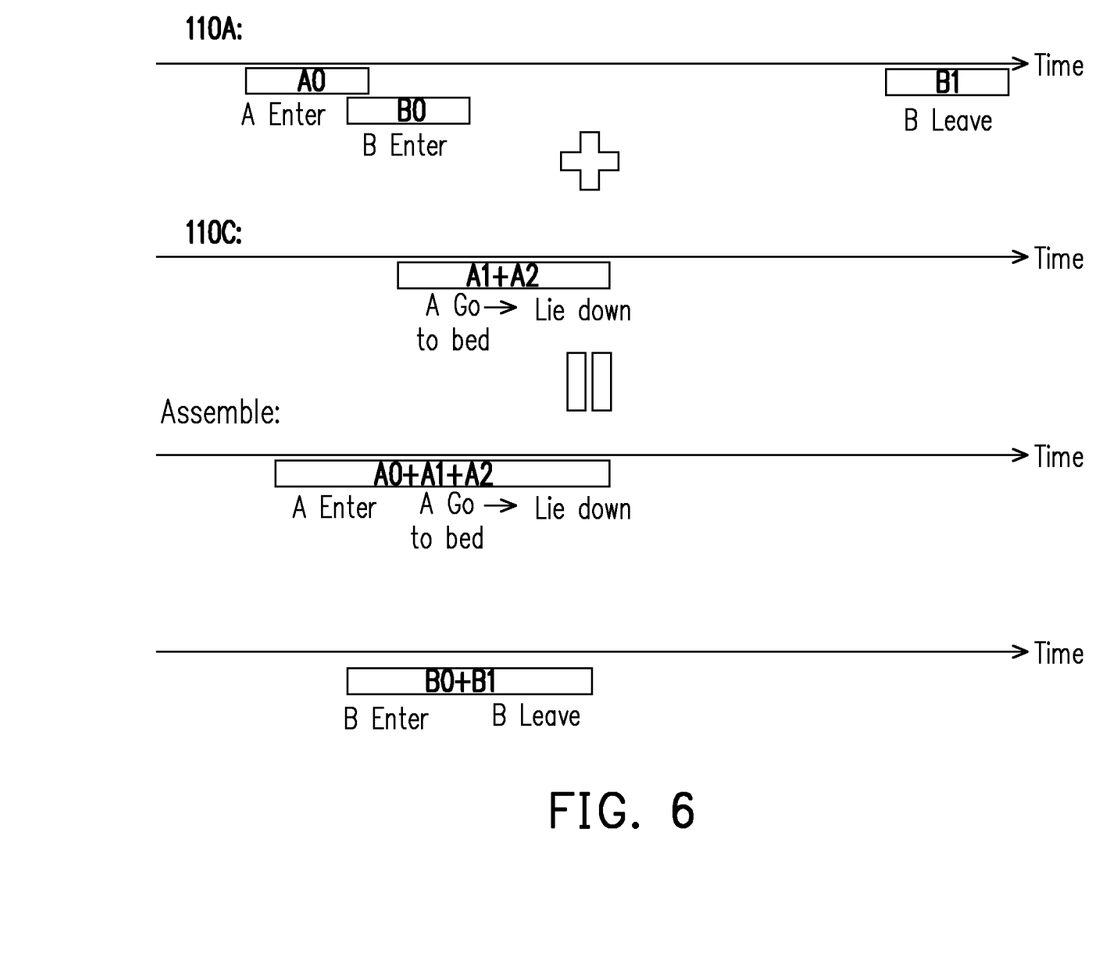
FIG. 6 is a schematic diagram of obtaining an event film by assembling a plurality of concerned clips including different people according to an embodiment of the present invention.

FIG. 6 is a schematic diagram of obtaining an event film by assembling a plurality of concerned clips including different people according to an embodiment of the present invention.

Referring to FIG. 6, event clips A0, B0, and B1 are, for example, extracted by the clip extracting module 132c from the video files captured by the camera 110A, where the event clip A0 includes an entry event of a person A, the event clip B0 includes an entry event of a person B, and the event clip B1 includes a leaving event of the person B. The event clip A1+A2 is, for example, an assembling result of the clip assembling module 132d, including a going-to-bed event and a lying-down event of the person A.

In some embodiments, the processor 131 uses, for example, a method of image analysis to detect a person corresponding to an event. For example, the processor 131 may first use face detection to identify a person corresponding to an event. For another example, the processor 131 may also estimate only the height of a person in an image, or use an image histogram to obtain the color of clothes, and the like to determine whether the detected event corresponds to the same person or not. In other words, the present invention does not limit a specific judgment manner of a person corresponding to an event.

In the present embodiment, the clip assembling module 132d assembles event clips according to a person corresponding to an event. Since the events in the event clip A0 and the event clip B0 correspond to different people, although the time intervals of the event clips A0 and B0 overlap, the clip assembling module 132d does not assemble the event clip A0 and the event clip B0. Since the events in the event clip A0 and the event clip A1+A2 both correspond to a figure A and the entry event, the going-to-bed event and the lying-down event conform to a reasonable event sequence, the clip assembling module 132d merges the event clip A0 and the event clip A1+A2 into an event film A0+A1+A2. On the other hand, since the events in the event clip B0 and the event clip B1 both correspond to a person B and the entry event and the leaving event conform to a reasonable event sequence, the clip assembling module 132d merges the event clip B0 and the event clip B1 into another event film B0+B1.

In this way, the processor 131 can merge a plurality of consecutive event clips conforming to the merging rule among the plurality of event clips into an event film. Finally, the processor 131 outputs the event film and the event clips that are not merged (step S308). In detail, the film outputting module 132e outputs other event clips that are not merged into the event film, in addition to the event film generated by the clip assembling module 132d. For example, the film outputting module 132e uploads and stores, for example, the event film and the event clips not merged into the event film to the cloud database 140, the event film and the event clips uploaded to the cloud database 140 may be, for example, presented in the form of a list in a web page, and a user is allowed to download the event film or event clips through clicking or view the clicked event film or event clips online.

In some embodiments, before outputting the event films and the event clips, the film outputting module 132e may first name each event film and event clip according to the events therein. For example, the processor 131 presets an importance ranking of various events, and names, according to the event with the highest importance ranking in an event film or event clip, the event film or event clip. For example, in FIG. 5, the importance ranking of the falling event is the highest, so the event film V0+V1+V2+V3+V4+V5+V6 will be named according to the falling event, and is named "falling at 14:00:40", for example, according to the falling event and its occurring time. However, the present invention does not limit the naming manner herein. In other embodiments, the output event film and event clip may also be named in other manners.

Based on the foregoing, the video file processing method, the video file processing device, and the monitoring system provided by the embodiments of the present invention can analyze a plurality of event clips from video files captured by one or more cameras, and organize a portion of event clips into an event film through a well-defined merging rule. Accordingly, a user can find required segments more rapidly, thereby improving convenience and improving user experience.

Although the present invention has been disclosed with the foregoing embodiments, it is not intended to limit the present invention, and it is possible for any person of ordinary skill in the art to make some modifications and refinements without departing from the spirit and scope of the present invention. Therefore, the scope of protection of the present invention should be defined by the scope of the appended claims.

What is claimed is:

1. A video file processing method, comprising:
   acquiring a first video file including at least one first event from a first camera and acquiring a second video file including at least one second event from a second camera, wherein the first camera and the second camera are configured to capture environments of different event positions to produce the first video file and the second video file respectively;
   detecting the at least one first event from the first video file and detecting the at least one second event from the second video file;
   detecting a first occurring time of the at least one first event in the first video file and detecting a second occurring time of the at least one second event in the second video file;
   extracting at least one first event clip corresponding to the at least one first event from the first video file by acquiring a first time period before and after the first occurring time of the at least one first event;
   extracting at least one second event clip corresponding to the at least one second event from the second video file by acquiring a second time period before and after the second occurring time of the at least one second event;
   determining whether a time difference between occurring starting times of any two of extracted first event clips or between starting times of any two of extracted second event clips is less than a preset threshold value;
   finding an overlapped time segment between the any two of extracted first event clips or between the any two of extracted second event clips;
   generating an assembled event clip by both summing the any two of extracted first event clips or the any two of extracted second event clips and removing the overlapped time segment any two of extracted first event clips or between the any two of extracted second clips in response to the overlapped time segment between the any two of extracted first event clips or between the any two of extracted second event clips having been found;
   obtaining a merged event film by assembling a plurality of concerned clips according to a merging rule, wherein the plurality of concerned clips comprise one or more of the at least one first event clip, the at least one second event clip, and the assembled event clip, and each of the plurality of concerned clips included in the merged event film corresponds to different predetermined events; and
   outputting the merged event film.

2. The video file processing method according to claim 1, wherein the merging rule comprises a plurality of pre-defined reasonable event sequences, and the different predetermined events in the merged event film conform to the pre-defined reasonable event sequences.

3. The video file processing method according to claim 1, wherein the different predetermined events occur and are detected in the first video file and the second video file.

4. The video file processing method according to claim 1, wherein the step of obtaining the merged event film by assembling the plurality of concerned clips according to the merging rule comprises:
   sorting the at least one first event clip and the at least one second event clip according to a starting time thereof;
   determining whether the different predetermined events in a plurality of consecutive event clips in the at least one first event clip and the at least one second event clip conform to the merging rule; and
   obtaining the merged event film by merging, in response to a determining result indicative of that the different predetermined events in the consecutive event clips conform to the merging rule, the consecutive event clips.

5. The video file processing method according to claim 1, wherein the different predetermined events comprised by the concerned clips correspond to a same person.

6. The video file processing method according to claim 1, wherein the step of outputting the merged event film comprises:
uploading and storing the merged event film into a cloud database.

7. A video file processing device, comprising:
a storage element, storing a plurality of instructions; and
a processor, coupled to the storage element, and configured to load the instructions, and when the instructions are executed, the processor functions as:
a video file acquiring module, configured to acquire a first video file including at least one first event from a first camera and acquiring a second video file including at least one second event from a second camera, wherein the first camera and the second camera are configured to capture environments of different event positions to produce the first video file and the second video file respectively;
an event detecting module, configured to detect the at least one first event from the first video file and detect the at least one second event from the second video file, and to detect a first occurring time of the at least one first event in the first video file and detect a second occurring time of the at least one second event in the second video file;
a clip extracting module, configured to extract at least one first event clip corresponding to the at least one first event from the first video file by acquiring a first time period before and after the first occurring time of the at least one first event and extract at least one second event clip corresponding to the at least one second event from the second video file by acquiring a second time period before and after the second occurring time of the at least one second event;
a clip assembling module, configured to:
determine whether a time difference between starting times of any two of the extracted first event clips or between starting times of any two of the extracted second clips is less than a preset threshold value;
finding an overlapped time segment between the any two of extracted first event clips or between the any two of extracted second event clips;
generating an assembled event clip by both summing the any two of extracted first event clips or the any two of extracted second event clips and removing the overlapped time segment between the any two of extracted first event clips or between the any two of extracted second clips in response to the overlapped time segment between the any two of extracted first event clips or between the any two of extracted second event clips having been found;
obtain a merged event film by assembling a plurality of concerned clips according to a merging rule, wherein the plurality of concerned clips comprise one or more of the at least one first event clip, the at least one second event clip, and the assembled event clip, and each of the plurality of concerned clips included in the merged event film corresponds to different predetermined events, wherein the merging rule comprises a plurality of pre-defined reasonable event sequences, and the different predetermined events in the merged event film conform to the pre-defined reasonable event sequences; and
a film outputting module, configured to output the merged event film.

8. The video file processing device according to claim 7, wherein the event detecting module detects the predetermined different events which occur in the first video file and the second video file.

9. The video file processing device according to claim 7, wherein the clip assembling module is configured to:
sort the at least one first event clip and the at least one second event clip according to a starting time thereof;
determine whether the different predetermined events in a plurality of consecutive event clips in the at least one first event clip and the at least one second event clip conform to the merging rule; and
obtain the merged event film by merging, in response to a determining result indicative of that the different predetermined events in the consecutive event clips conform to the merging rule, the consecutive event clips.

10. The video file processing method according to claim 7, wherein the different predetermined events comprised by the concerned clips correspond to a same person.

11. The video file processing method according to claim 7, wherein the film outputting module uploads and stores the merged event film into a cloud database.

12. A monitoring system, comprising:
a first camera, configured to capture a first video file including at least one first event;
a second camera, configured to capture a second video file including at least one second event, wherein the first camera and the second camera are configured to capture environments of different event positions to produce the first video file and the second video file respectively; and
a video recording device, coupled to the first camera and the second camera, and configured to:
receive and record the first video file and the second video file;
detect the at least one first event from the first video file and detect the at least one second event from the second video file;
detect a first occurring time of the at least one first event in the first video file and detect a second occurring time of the at least one second event in the second video file;
extract at least one first event clip corresponding to the at least one first event from the first video file by acquiring a first time period before and after the first occurring time of the at least one first event;
extract at least one second event clip corresponding to the at least one second event from the second video file by acquiring a second time period before and after the second occurring time of the at least one second event;
determine whether a time difference between starting times of any two of the extracted first event clips or between starting times of any two of the extracted second clips is less than a preset threshold value;
finding an overlapped time segment between the any two of extracted first event clips or between the any two of extracted second event clips;
generating an assembled event clip by both summing the any two of extracted first event clips or the any two of extracted second event clips and removing the overlapped time segment between the any two of extracted first event clips or between the any two of extracted second clips in response to the overlapped time segment between the any two of extracted first event clips or between the any two of extracted second event clips having been found;

obtain a merged event film by assembling a plurality of concerned clips according to a merging rule, wherein the plurality of concerned clips comprise one or more of the at least one first event clip, the at least one second event clip, and the assembled event clip, and each of the plurality of concerned clips included in the merged event film corresponds to different predetermined events, wherein the merging rule comprises a plurality of pre-defined reasonable event sequences, and the different predetermined events in the merged event film conform to the pre-defined reasonable event sequences; and output the merged event film.

13. The monitoring system according to claim 12, wherein the video recording device comprises a network video recorder and a video file processing device coupled to each other, the first video file and the second video file captured by the first camera and the second camera are recorded in the network video recorder, and the video file processing device is able to acquire the first video file and the second video file from the network video recorder and generate the merged event film by performing an assembling operation.

14. The monitoring system according to claim 13, further comprising:

a cloud database, wherein the video file processing device is coupled to the cloud database, and configured to upload and store the merged event film into the cloud database.

* * * * *